Dec. 14, 1943.                F. J. TIPPEN                2,336,654
              GOVERNING GEAR FOR ENGINES AND OTHER MACHINES
                          Filed Nov. 7, 1942
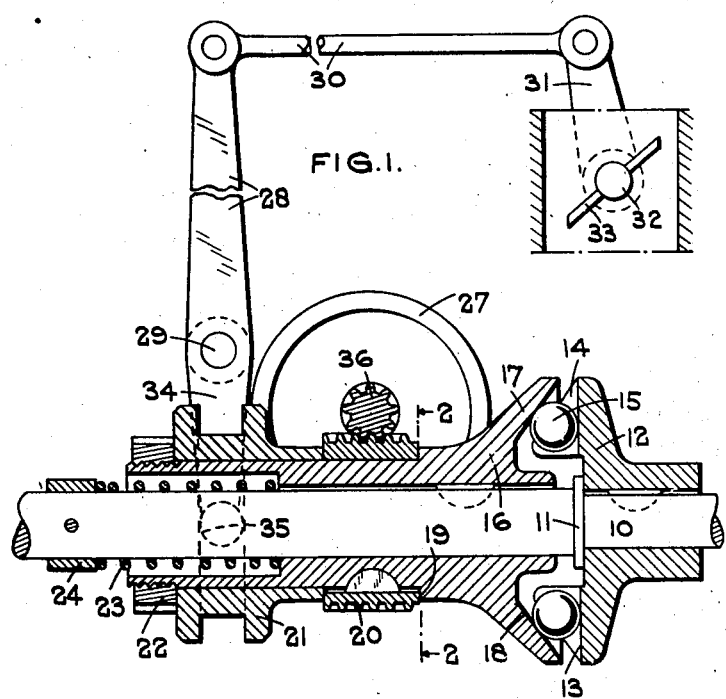
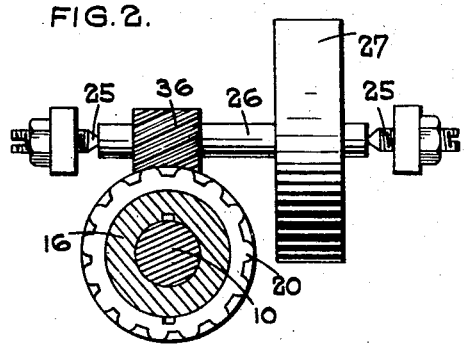
INVENTOR
Frank John Tippen
BY Harry J. Lucke
HIS ATTORNEY Patented Dec. 14, 1943

2,336,654

UNITED STATES PATENT OFFICE 2,336,654

GOVERNING GEAR FOR ENGINES AND OTHER MACHINES

Frank John Tippen, Coventry, England, assignor to Leonard Pelham Lee, near Stratford-on-Avon, England Application November 7, 1942, Serial No. 464,898
In Great Britain February 11, 1942

6 Claims. (Cl. 264—6)

This invention relates to an inertia speed regulating device for engines or machines.

It is well known that the centrifugal governor is powerless to prevent variations of speed of an engine or machine because the governor does not operate until a change of speed has occurred.

The object of the present invention is to provide a governor which although still powerless to prevent speed variations, will limit the extent and duration of the departure from the normal speed produced by any particular cause of speed variation, such, for instance, as an increase or decrease of load. For instance, if with a given engine a 10% decrease of load produces a temporary 5% increase of speed, with a governor constructed in accordance with this invention, an increase of speed will occur but it will be less than 5%.

According to the present invention, I provide governing gear for engines or machines, wherein a positively driven governor operated sleeve coupled by suitable mechanism to an engine or machine regulator is also coupled by skew or equivalent gear to a shaft carrying a fly wheel, whereby when a change of speed occurs, the sleeve is given, by the axial thrust of the gear thereon, an endwise impulse additional to, and in the same direction as, that produced by the ordinary operation of the governor due to a change of speed.

By skew or equivalent gear I mean gear wherein the engagement between the fly wheel shaft and the gear member on the governor sleeve is by helical teeth, whereby when changes of speed occur, an axial thrust on the teeth of said gear member is produced, the fly wheel shaft being prevented from movement parallel to the governor sleeve. The gear may, for instance, be skew gear or worm gear.

With such a governor, the sleeve is coupled by skew gear or its equivalent to a shaft carrying a rotating fly wheel, the inertia of which is considerable, and which as a consequence resists changes of speed in the skew or equivalent gear member on its shaft. Assuming that there is an increase of speed of the governor sleeve, the skew gear member on the sleeve will attempt to increase the speed of the fly wheel, which attempt will be resisted by the inertia of the fly wheel with the result that the gear member on the fly wheel shaft will provide a reaction on the gear member on the governor sleeve which produces an increased endwise thrust thereon, thus increasing the endwise motion of the governor sleeve until the increase of speed of the engine or machine is arrested or until the speed of the engine or machine begins to fall. When this occurs, the sleeve will start to move back towards its original position under the influence of the governor spring, and as the sleeve moves back, it will, because of the inertia of the fly wheel operating again to resist a change of speed, receive an additional endwise thrust in the reverse direction (i. e. towards its original position) from the gear member on the fly wheel shaft.

It will be seen therefore, that movement of the governor sleeve in either direction is furnished with additional energy by the interchange of torque between the governor sleeve and the fly wheel, thereby increasing the sensitivity and rapidity of action of the governor and its power to overcome frictional resistances and/or inertia in the mechanism coupling it to the engine or machine regulator.

Referring to the drawing:

Figure 1 is a sectional view in side elevation showing one construction.

Figure 2 is a section on line 2—2 of Figure 1.

In the construction illustrated, the governor is mounted on the shaft 10 having a shoulder 11. One part 12 of the governor has a flat face 13 provided with pairs of projections 14 between which weights or balls 15 can roll.

The other part 16 of the governor is provided with a cup portion 17 which in the construction shown has a conical face 18. Instead of this face being conical, it may be of curved profile.

Both the members 12 and 16 are keyed to the shaft 10 so that both are positively driven.

The governor sleeve 16 is provided with an external shoulder 19, against which is clamped a skew gear member 20, this member being keyed to the governor sleeve and also being held against endwise movement by a muff 21 retained in position by a nut 22.

The end of the governor sleeve 16 adjacent the muff is recessed and receives the loading spring 23 which finds an abutment against the collar 24.

Mounted in end thrust bearings 25 is a transverse shaft 26 on which is fixed a fly wheel 27. The shaft 26 has fixed thereon a skew gear member 36 which gears with the member 20 and is driven thereby.

Any suitable form of connection may be provided from the muff 21 to the regulating member of the engine or machine, and the latter may take the form of a throttle valve or any other element which is adapted to regulate speed.

In the drawing the mechanical connection takes the form of a lever 28 pivoted at 29 and connected by a link 30 to a lever 31 connected to the spindle 32 of a throttle valve 33.

The arm 34 of the lever is provided with a trunnion or roller 35 engaging the muff.

In operation during normal running, the skew gearing drives the shaft 26 so that normally the fly wheel 27 is running at a substantially constant speed.

When a change of speed occurs and the governor sleeve moves in an endwise direction, the speed of rotation of the governor sleeve is increased or decreased, and this change of speed is resisted by the inertia of the fly wheel acting through skew or equivalent gear. The reaction on the inclined teeth of the gear members thus produces an additional endwise thrust on the governor sleeve, this endwise thrust being in the same direction as that produced either by the balls 15 or the spring 23. Thus the fly wheel provides additional energy to co-operate with that produced by the balls in one direction and by the spring in the other direction.

Further, the inertia of the members constituting the mechanical connection between the governor sleeve and the regulator of the engine or machine which tends to cause instability and speed fluctuations, is opposed by the inertia of the fly wheel which reduces such fluctuations.

This function of the fly wheel is particularly valuable when sudden and temporary changes of engine or machine speed occur.

When the engine or machine starts from rest it is necessary to build up fly wheel speed, and the fly wheel will resist this building up of speed on account of the reaction from the skew gear. At low speeds, however, the relationship between the pressure of the governor spring and the axial component received from the centrifugal force of the balls is such that the spring pressure predominates and provides a reserve of end thrust which is available to overcome the inertia reaction of the fly wheel. This preponderance of spring pressure persists and only disappears when the fly wheel reaches governed speed.

Further, if the fly wheel should be driven above its normal speeed temporarily owing to the governor shaft rotating above its normal speed, the axial component produced by the centrifugal force of the balls will predominate over the spring pressure and this will provide an end thrust reserve available for retarding the fly wheel speed.

Thus it will be seen that the normal speed of the fly wheel will be determined by the action of the governor, and in normal working although subject to minor variations on each side of this normal, such variations will be limited by the reactions in one or the other direction produced by the governor.

What I claim then is:

1. Governing gear for engines or machines, comprising a positively driven governor-operated sleeve, a regulator for the engine or machine, means coupling said sleeve to said regulator, whereby said regulator is operated by endwise movements of the sleeve, a shaft, means for preventing said shaft from moving parallel to the governor sleeve, a fly wheel on said shaft, engaging gear wheels on said sleeve and on said shaft, said gear wheels having helical teeth, whereby when a change of speed occurs, the sleeve is given, by the axial thrust of the gear wheel thereon, an endwise impulse additional to, and in the same direction as, that produced by the ordinary operation of the governor due to the change of speed.

2. Governing gear according to claim 1, wherein the shaft is disposed transversely to the governor sleeve.

3. Governing gear for engines or machines, comprising a shaft driven by the engine or machine, a governor sleeve mounted on and driven by said shaft, centrifugal means producing endwise movement of said sleeve in response to increases of speed, a spring operating on said sleeve and opposing governor-produced endwise movements thereof, a regulator for the engine or machine, means coupling said sleeve to said regulator, whereby said regulator is operated by endwise movements of the sleeve, a secondary shaft, supporting means for said secondary shaft, said supporting means permitting the rotation of said secondary shaft but preventing movements thereof parallel to the governor sleeve, and a fly wheel on said secondary shaft, said secondary shaft and governor sleeve being coupled by helical gearing.

4. Governing gear for engines or machines, comprising a shaft driven by the engine or machine, a governor sleeve mounted on and driven by said shaft, centrifugal means producing endwise movement of said sleeve in response to increases of speed, loading means operating on said sleeve and opposing governor-produced endwise movements thereof, a regulator for the engine or machine, means coupling said sleeve to said regulator, whereby said regulator is operated by endwise movements of the sleeve, a secondary shaft disposed transversely to said sleeve and in a different plane from that in which said sleeve is disposed, supporting means for said secondary shaft, said supporting means permitting the rotation of said secondary shaft but preventing endwise movements thereof and movements thereof parallel to the governor sleeve, and a fly wheel on said secondary shaft, said secondary shaft and governor sleeve being coupled by helical gearing.

5. Governing gear for engines or machines, comprising a shaft driven by the engine or machine, a governor sleeve mounted on and driven by said shaft, centrifugal means producing endwise movement of said sleeve in response to increases of speed, loading means operating on said sleeve and opposing governor-produced endwise movements thereof, a regulator for the engine or machine, a muff on said sleeve, a lever engaging said muff, means coupling said lever to said regulator, a secondary shaft disposed transversely to said sleeve and in a different plane from that in which said sleeve is disposed, supporting means for said secondary shaft, said supporting means permitting the rotation of said secondary shaft but preventing movements thereof parallel to the governor sleeve, and a fly wheel on said secondary shaft, said secondary shaft and governor sleeve being coupled by helical gearing.

6. Governing gear for engines or machines, comprising a shaft driven by the engine or machine, a governor sleeve mounted on and driven by said shaft, centrifugal means producing endwise movement of said sleeve in response to increases of speed, said sleeve having an external shoulder, a muff on said sleeve, a gear wheel having helical teeth mounted on said sleeve, the ends of said wheel engaging respectively said shoulder and one end of the muff, a nut threaded on to the end of the sleeve and engaging the other end of the muff, a collar on the shaft, a spring operating between said collar and said sleeve, said spring opposing governor-produced endwise movements thereof, a regulator for the engine or machine, a lever engaging said muff, means coupling said lever to said regulator, a secondary shaft disposed transversely to said sleeve and in a different plane from that in which said sleeve is disposed, supporting means for said secondary shaft, said supporting means permitting the rotation of said secondary shaft but preventing movements thereof parallel to the governor sleeve, a fly wheel on said secondary shaft, and a gear wheel having helical teeth mounted on said secondary shaft, said gear wheel engaging the gear wheel on said sleeve.

F. J. TIPPEN.